Patented Feb. 2, 1954

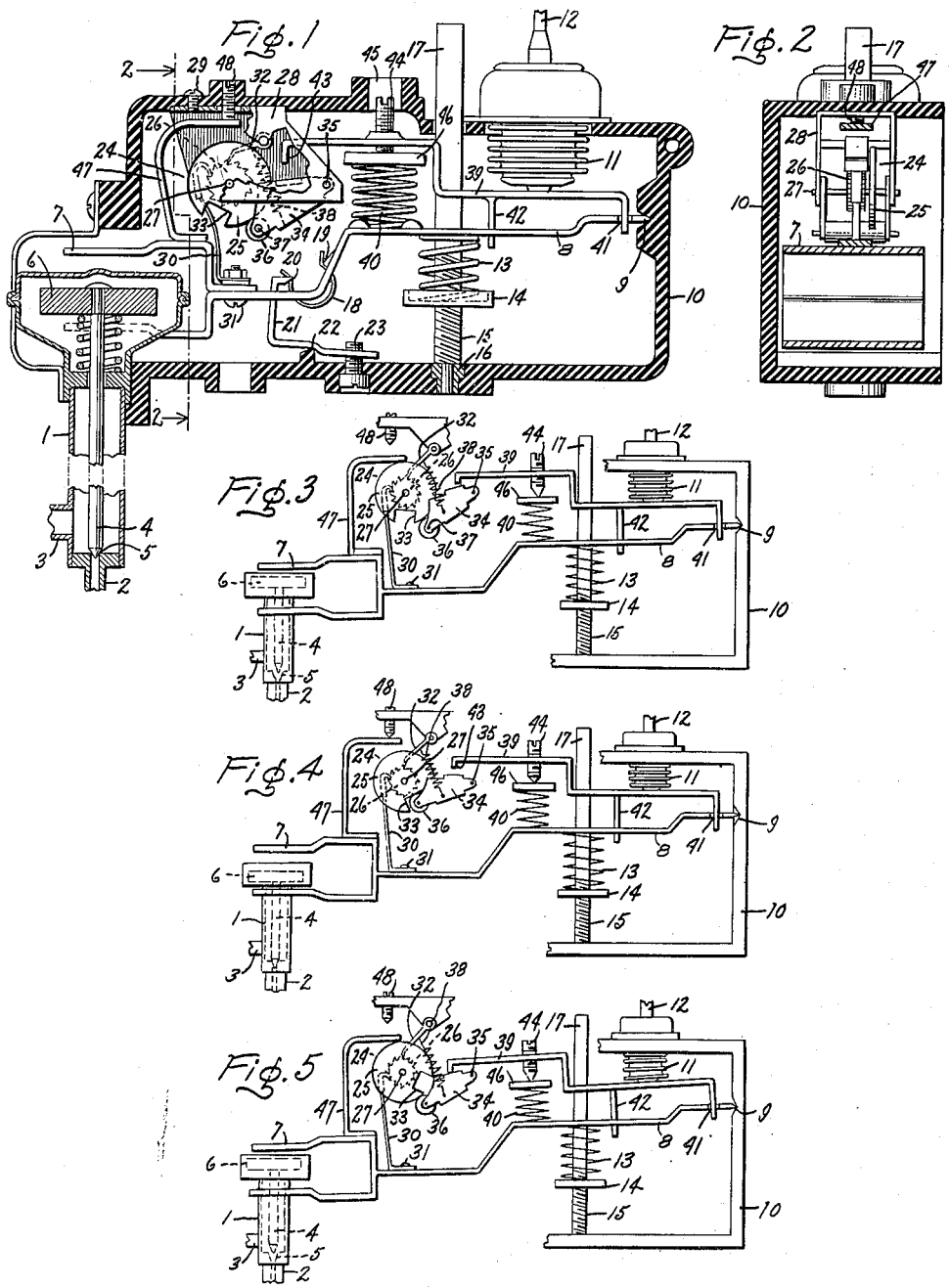

2,667,755

UNITED STATES PATENT OFFICE 2,667,755

AUTOMATIC DEFROST CONTROL

Charles S. Grimshaw, Erie, Pa., assignor to General Electric Company, a corporation of New York Application December 19, 1951, Serial No. 262,448

9 Claims. (Cl. 62—2)

My invention relates to defrosting apparatus and more particularly to controls for automatically effecting defrosting of refrigerator evaporators.

In many household refrigerators, the evaporator for cooling the food storage compartment is exposed to the air in this compartment. Since the evaporator is at a colder temperature than the air and below the freezing point of water, moisture condenses on the evaporator and forms as frost. Ultimately, in order to maintain the desired operating efficiency of the evaporator, it is necessary to remove this insulating layer of frost. Since the removal of this frost manually is a somewhat distasteful and time-consuming task, it is desirable to provide some automatic means for effecting the defrosting of the evaporator at intervals.

Accordingly, it is an object of my invention to provide an improved control for automatically effecting defrosting of an evaporator.

It is another object of my invention to provide an improved arrangement for starting refrigeration at the expiration of the defrosting period.

It is a further object of my invention to provide a control including an improved arrangement for obtaining a defrost temperature setting which is independent of changes in the normal temperature setting.

Further objects and advantages of my invention will become apparent as the following description proceeds and the features of novelty which characterize my invention will be pointed out with particularity in the claims annexed to and forming part of this specification.

In carrying out the objects of my invention, the operating arm of the control for starting and stopping refrigeration during normal operation has secured thereto a pawl for engaging a ratchet to advance a cam each time the operating arm moves to its refrigeration-starting position. The cam includes a recess in the periphery thereof, and a locking element is provided for engaging the recess after a predetermined rotation of the cam to block further rotation of the cam and its associated ratchet. The operating arm is then held against movement toward its refrigeration-starting position because of engagement of the pawl and ratchet until a predetermined abnormally high defrosting temperature is reached. Upon occurrence of this predetermined abnormally high temperature the locking element is moved out of engagement with the cam recess to restore normal operation.

For a better understanding of my invention reference may be had to the accompanying drawing in which Fig. 1 is a sectional elevation view of a control illustrating an embodiment of my invention; Fig. 2 is a view taken along the line 2—2 in Fig. 1; and Figs. 3, 4, and 5 illustrate the relationship of the parts under various conditions of operation.

Referring to the drawing, the control is shown as applied to controlling the position of a valve 1 for governing flow of refrigerant from a conduit 2 to a conduit 3. Refrigerant is supplied through conduit 3 to an evaporator or other cooling unit (not shown). The valve 1 includes a valve plunger 4 adapted to engage a valve seat 5. A magnet 6 is secured to the upper end of the plunger, and the position of this magnet and of the plunger is controlled by a movable yoke 7 acting on the magnet. While in the specific illustration, the control has been shown acting to control the position of the valve for governing the flow of refrigerant to an evaporator or other cooling unit, it will be apparent, as the following description proceeds, that this control can equally well be employed for opening and closing contacts to stop and start a refrigerating unit in the conventional manner employed in such controls.

The valve-controlling yoke 7 is mounted on one end of an operating arm 8. The other end of the arm 8 is pivoted at 9 in a recess formed in the housing 10 of the control. It can be seen that as the operating arm 8 and the yoke 7 move downwardly from the position shown in Fig. 1, the upper portion of the yoke 7 approaches more closely to the magnet 6 until ultimately the magnet is attracted upwardly to open the valve 5, initiating refrigeration. Conversely, as the operating arm 8 and the yoke 7 move upwardly, the lower portion of the yoke approaches more closely to the magnet than the upper portion, and the magnet 6 is then attracted downwardly to close the valve 1.

In order to effect movement of the operating arm 8 between one position for opening the valve to start refrigeration and a second position for closing the valve to stop refrigeration, a temperature-responsive element or bellows 11 is mounted on the housing 10. The bellows is connected by a tube 12 to a thermostatic bulb (not shown) positioned to be responsive to the temperature of the evaporator. The operating arm 8 is biased by a spring 13. One end of this spring 13 engages the operating arm 8 and the other end engages a cup-shaped element 14 which is in threaded engagement with a shaft 15 extending through the spring 13. The shaft 15 is rotatably mounted at 16 in the housing 10 and one end 17 of the shaft extends outside the housing, so that the shaft may be rotated to vary the position of the element 14 and hence, the compression of the spring 13, thereby varying the temperature settings for normal operation. The element 14 includes a projection (not shown) engaging the housing 10 for preventing rotation of this element.

Under normal operating conditions, that is, during the normal cycling of the refrigerating system, the movement of the operating arm 8 and hence, the position of the valve 1, is controlled by the expansion and contraction of the bellows 11 under the biasing force of the opposing spring 13. For example, in the position of the control shown in Fig. 1, the yoke 7 is in its upper position, thereby attracting the magnet 6 downwardly and closing the valve 1 to block supply of refrigerant. As the temperature of the evaporator increases, the bellows 11 expands moving the arm 8 and the yoke 7 downwardly until, at a predetermined maximum normal temperature, the magnet 6 is attracted upwardly, opening the valve and starting refrigeration. A hairpin spring 18 is provided between a knife edge 19 formed on the operating arm 8 and a second knife edge 20 formed on a bracket 21 mounted on the housing 10. The bracket 21 engages a fulcrum 22 and the position of the bracket is adjustable by means of a screw 23 for varying the difference between the maximum and minimum temperatures during normal operation.

In order to effect periodic defrosting of the evaporator, a mechanism including a rotatable structure 24 is provided. This rotatable structure includes a cam 25 and a ratchet 26 formed integrally with or at least mounted on a shaft 27 in such a manner that there is no relative rotation between the cam 25 and the ratchet 26. The shaft 27 is rotatably mounted in a U-shaped bracket 28 which is secured to the housing 10 by screws or other fastening devices, one of which is shown at 29. A pawl 30 of somewhat resilient material is mounted on the operating arm 8 by a rivet 31 or other suitable fastening device, and this pawl is arranged to engage the ratchet 26. It can be seen that each time the operating arm 8 moves down to its refrigeration-starting position, the ratchet is advanced one tooth by the pawl 30. This results in a corresponding angular movement of the entire rotatable structure 24 including the cam 25 and the ratchet 26. Reverse movement of the ratchet 26 is prevented by locking pawl 32 which is pivotally mounted on the bracket 28.

The cam 25 is provided with a recess 33 in the periphery thereof. The defrosting mechanism also includes a pivoted lever 34, which is pivotally mounted by a pin 35 on the bracket 28. The pivoted lever 34 includes at its free end a roller 36 which is pivotally mounted on the lever 34 by a pin 37. The roller 36 is biased into engagement with and rides on the peripheral surface of the cam 25 by a spring 38. The spring 38 is connected to the lever 34 and the locking pawl 32, so that this spring not only biases the roller 36 into engagement with the periphery of the cam but also biases the locking pawl 32 into engagement with the ratchet 26.

As the control cycles during normal operation of the refrigerating system, the ratchet 26 and hence, the cam 25 are advanced by the pawl 30 each time the operating lever 8 moves to its refrigeration-starting position. It can be seen that after a predetermined number of such cycles, the rotatable structure 24 including the cam 25 and the ratchet 26 will have been advanced or rotated a sufficient distance to bring the recess 33 in alignment with the roller 36. The roller 36 is then pulled by the spring 38 into the recess, and blocks further rotation of the cam, thereby also blocking, of course, any further rotation of the ratchet 26. Under these circumstances, as the temperature of the evaporator increases and hence, as the bellows 11 expands, the operating arm 8 cannot move downwardly to start refrigeration because such movement is blocked by engagement of the pawl 30 with the teeth of the ratchet 26, whose rotation is blocked by the engagement of the roller 36 in the recess 33 of the cam. Hence, refrigeration cannot start at the normal maximum temperature and the temperature of the evaporator increases to an abnormally higher temperature, for effecting defrosting of the evaporator. In order to provide for moving the pivoted lever 34 out of locking engagement with the cam 25 and to provide a predetermined maximum defrost temperature which is independent of the setting for normal maximum and minimum temperatures, a mechanism including a second pivoted arm 39 and a defrost spring 40 is provided. The arm 39 extends generally parallel to the operating arm 8 and is pivotally mounted on the arm 8 at 41. The spring 40 is arranged between the arms 8 and 39, normally urging these arms apart to the position shown in Fig. 1, the movement of the arm 39 away from the arm 8 under the bias of the spring 40 being limited by the engagement of a T-shaped depending member 42 with the lower surface of the operating arm 8. This member 42 is formed integral with or secured to the arm 39. The arm 39 is shaped at its lefthand end to provide a depending flange 43 which is adapted to engage the pivoted lever 34 to move this lever out of locking engagement with the cam 25.

Under normal operation the bellows moves the arms 8 and 39 as a unitary structure against the bias of the spring 13. The spring 40 is not compressed during such movement since, being selected to be compressed at defrost pressure in the bellows 11, it exerts a greater force than spring 13. However, when downward movement of the arm 8 is prevented by the aforementioned engagement of the pawl 30 with the ratchet 26 of the locked rotatable structure, continued expansion of the bellows is effective to move the arm 39 downwardly relative to the arm 8, compressing the defrost spring 40. When the evaporator temperature has reached a predetermined abnormally high value, the resultant expansion of the bellows moves the arm 39 downwardly sufficiently that the flange portion 43 thereof engages the pivoted lever 34 and moves this lever in a counterclockwise direction to shift the roller out of the recess 33 of the cam. As soon as the cam is released from the blocking force exerted by the roller 36, the arm 8 moves downwardly under the influence of the bellows 11, moving the pawl 30 downwardly and advancing the now unlocked rotatable structure through engagement with the ratchet 26. Thus, as soon as the bellows has expanded to the predetermined maximum defrosting temperature, the locking force on the rotatable structure 24 is released, the cam is advanced, and the arm 8 is moved downwardly to attract the magnet 6 upwardly starting refrigeration and terminating the defrosting period. This immediate advance of the cam as the roller is moved out of the recess 33 also insures that this recess 33 is positioned beyond the roller 36 so that upon subsequent contraction of the bellows as the evaporator cools, the roller cannot reenter the recess 33.

It can be seen that since the arm 8 is locked during the defrost period, the spring 13 has no effect on the defrost temperature. The defrost temperature is determined entirely by the setting of the spring 40 which opposes the movement of the arm 39 toward the arm 8. Hence, any variation in the normal temperature setting, that is, the setting of the maximum and minimum temperatures maintained during the normal operating cycles, has no effect on the maximum temperature to be reached during the defrost period. The maximum defrost temperature may be adjusted to any desired value by means of a screw 44 accessible from the exterior of the housing 19 through an opening 45. The screw 44 is in threaded engagement with an opening in the arm 39 and engages a cap 46 to vary the compression of the spring 40 and, hence, to vary the defrost temperature.

The broad idea of a control structure including two generally parallel arms having a defrost spring therebetween and a stop limiting the movement of one of the arms so as to secure an independent defrost temperature is not part of the present invention but is described and claimed in my copending application Serial No. 203,166, filed December 28, 1950, now Patent No. 2,627,561, issued February 3, 1953, and assigned to the assignee of the present invention. Insofar as this phase of the structure is concerned, the present invention relates only to the combination of such a structure with a particular stop arrangement and the means for shifting the stop under certain conditions.

The broad idea of a defrost control which includes an operating arm and a pivoted interfering member for blocking movement of the arm under predetermined conditions is not part of the present invention but is described and claimed in my copending application, Serial No. 262,446, filed December 19, 1951, and assigned to the assignee of the present invention. The present invention is directed to the combination which includes the engagement of a pivoted member with a cam to block rotation of the cam resulting in blocking of the movement of the operating arm because of the engagement of a pawl with a ratchet rotatable with the cam.

Another feature of the control is the overhanging brake arm 47. This brake arm 47 performs a triple function in the control. It limits the movement of the operating arm 8 in the position shown in Fig. 1, that is, in its refrigeration-stopping or valve-closing position by engagement with a screw 48. The screw 48 is in threaded engagement with the housing 19 and may be adjusted to vary the position of the arm 8 in its valve-closing position. Secondly, the brake arm 47 limits the movement of the arm 8 toward its refrigeration-starting position, as illustrated in Fig. 3, by engagement with the top surface of the cam 25 of the rotatable structure 24. Finally, the brake arm 47, by engagement with the cam 25, prevents overtravel of the cam. Thus, when the arm 8 has moved the valve to its open position and the pawl 30 has advanced the ratchet by the amount of one tooth, the brake arm 47 engages the cam 25 and positively prevents any coasting or overtravel of this cam beyond the one-tooth advance. This braking is particularly important at the termination of the defrost period, because of the energy stored in the resilient pawl 30 and acting to rotate the ratchet 26 as soon as the locking roller 36 is moved out of the recess 33.

The operation of the automatic defrost control is illustrated in successive stages in Figs. 1, 3, 4, and 5. In Fig. 1, the parts are shown during normal operation in the valve-closed or refrigeration-stopping position. As the temperature reaches the predetermined normal maximum, the expansion of the bellows 11 moves the assembly including the arms 39 and 8 downwardly, thereby shifting the yoke 7 to the position shown in Fig. 2. In this position, the yoke actuates the magnet 6 upwardly opening the valve 1 and starting refrigeration. During the movement of the mechanism from the position shown in Fig. 1 to that shown in Fig. 2, the pawl 30, which is mounted on the arm 8, effects an advance of the ratchet 26 and the cam 25, shifting the recess 33 in the cam from the position shown in Fig. 1 to that shown in Fig. 2. The next actuation of the arm 8 to the valve-opening position results in an advancing of the ratchet and the cam one more step aligning the recess 33 in the periphery of the cam with the roller 36 of the pivoted spring-biased lever 34. The roller is then pulled into the recess 33 locking the cam, and hence the rotatable structure including the ratchet 26 against further movement. When the arm 8 has moved upwardly to its valve-closing position after this engagement of the roller 36 in the recess 33, the parts occupy a position shown in Fig. 4. It can be seen that downward movement of the arm 8 to the valve-opening position is positively prevented by engagement of the pawl 30 with the ratchet 26 which is blocked from further rotation by the locking engagement of the roller 36 in the recess 33 of the cam 25. Further expansion of the bellows during the rise in temperature to the predetermined abnormal maximum temperature required for defrosting then acts to move the arm 39 toward the arm 8 against the bias of the defrost spring 40, eventually moving a sufficient distance that the flanged portion 43 of the arm 39 engages the lever 34, swinging this lever in a counterclockwise direction and shifting the roller 36 out of locking engagement with recess 33. This frees the cam 25 and the ratchet 26 for further movement allowing downward movement of the pawl 30 and the operating arm 8 to the valve-opening position shown in Fig. 5, and terminating the defrost period. It can be seen by reference to Fig. 5 that the cam is immediately advanced one step during this valve-opening movement of the arm 8 shifting the recess 33 out of alignment with the roller 36, so that the roller 36 again rides on the outer periphery of the cam 26 and re-entry of the roller 36 into the recess 33 is prevented. It can be seen further by reference to Fig. 5 that, when the arm 8 moves to the valve-opening position there illustrated, terminating the defrosting period, the brake arm 47 is pulled into engagement with the periphery of the cam 25 preventing overtravel of this cam under the influence of the energy stored in the resilient pawl 30 as a result of the expansion of the bellows 11 during the defrosting period. The brake arm 47 also contacts the cam 25 during normal operation, limiting the downward travel of the arm 8 and retarding overtravel of the cam, although the tendency toward overtravel is not so great during normal operation as at the conclusion of the defrosting period.

While I have shown and described a specific embodiment of my invention, I do not desire my invention to be limited to the particular construction shown and described, and I intend, by the appended claims, to cover all modifications within the spirit and scope of my invention.

What I claim as new and desire to secure by Letters Patent of the United States is:

1. A refrigerator control comprising an operating arm movable between two positions for starting and stopping refrigeration at predetermined maximum and minimum temperatures, a temperature-responsive element for effecting movement of said arm, a biasing spring engaging said arm for opposing said element, a rotatable structure including a cam and a ratchet, a pawl mounted on said arm and engaging said ratchet for rotating said cam upon movement of said arm to its refrigeration-starting position, said cam having a recess in the periphery thereof, a pivoted lever, said lever including a roller, a second spring for biasing said lever to urge said roller into engagement with the periphery of said cam whereby said roller rides on the periphery of said cam during normal operation, said roller being receivable within said recess after predetermined rotation of said cam for blocking further movement of said rotatable structure, the engagement of said pawl with said ratchet preventing movement of said arm to its refrigeration-starting position when further movement of said cam is prevented by engagement of said roller with said recess whereby a defrost period is initiated, and means dependent upon a predetermined abnormally high temperature of said temperature-responsive element for engaging and shifting said roller out of said recess to again afford movement of said ratchet whereby said defrost period is terminated.

2. A refrigerator control comprising an operating arm movable between two positions for starting and stopping refrigeration at predetermined maximum and minimum temperatures, a temperature-responsive element for effecting movement of said arm, a biasing spring engaging said arm for opposing said element, a rotatable structure including a cam and a ratchet, a pawl mounted on said arm and engaging said ratchet for rotating said structure upon movement of said arm to its refrigeration-starting position, locking means effective after predetermined rotation of such structure for engaging said cam to block further movement of said rotatable structure, the engagement of said pawl with said ratchet preventing movement of said arm to its refrigeration-starting position when further movement of said ratchet is prevented by engagement of said locking means with said cam whereby a defrost period is initiated, and a second arm actuated by said temperature-responsive element for shifting said locking means out of locking engagement with said cam upon the occurrence of a predetermined abnormally high temperature to again afford the movement of said ratchet whereby said defrost period is terminated.

3. A refrigerator control comprising a pivoted operating arm movable between two positions for starting and stopping refrigeration at predetermined maximum and minimum temperatures, a temperature-responsive element for effecting movement of said arm, a biasing spring engaging said arm for opposing said element, a rotatable structure including a cam and a ratchet, a pawl mounted on said arm and engaging said ratchet for rotating said structure upon movement of said arm to its refrigeration-starting position, locking means effective after predetermined rotation of such structure for engaging said cam to block further movement of said rotatable structure, the engagement of said pawl with said ratchet preventing movement of said arm to its refrigeration-starting position when further movement of said ratchet is prevented by engagement of said locking means with said cam whereby a defrost period is initiated, a second pivoted arm extending generally parallel to said operating arm, and a second spring disposed between said arms for biasing said second arm away from said operating arm, said second arm being actuated by said temperature-responsive element against the bias of said second spring upon the occurrence of a predetermined abnormally high temperature of said temperature-responsive element for moving said locking means out of blocking engagement with said cam to again afford movement of said ratchet whereby said defrost period is terminated.

4. A refrigerator control including a first movable arm, a second movable arm generally parallel to said first arm, a spring between said arms for holding said arms in spaced relationship, a temperature-responsive element engaging one of said arms for shifting said arms as a unit during normal operation to start and stop refrigeration, a rotatable structure including a cam and a ratchet, a pawl on said first arm for engaging said ratchet to advance said ratchet and said cam during each normal operating cycle, and locking means for blocking further movement of said cam and said ratchet after a predetermined number of cycles to initiate a defrost period, said temperature-responsive element effecting movement of said second arm relative to said first arm against the bias of said spring, said second arm engaging said locking means when said temperature-responsive element has reached a predetermined temperature to shift said locking means out of blocking engagement for terminating the defrost period.

5. A refrigerator control comprising an operating arm movable between two positions for starting and stopping refrigeration at predetermined maximum and minimum temperatures, a temperature-responsive element engaging said arm for effecting movement thereof, a biasing spring engaging said arm for opposing said element, a rotatable structure including a cam, a pawl mounted on said arm and engaging said rotatable structure for rotating said cam upon movement of said arm to its refrigeration-starting position, locking means effective after predetermined rotation of said cam for engaging said cam to block further movement of said rotatable structure, the engagement of said pawl with said rotatable structure preventing movement of said arm to its refrigeration-starting position when further movement of said cam is prevented by said locking means whereby a defrost period is initiated, means dependent upon a predetermined abnormally high temperature of said temperature-responsive element for shifting said locking means out of blocking engagement with said cam to again afford movement of said rotatable structure whereby said defrost period is terminated, and a brake arm mounted on said operating arm and engaging said cam upon movement of said operating arm to its refrigeration-starting position for preventing overtravel of said cam.

6. A refrigerator control comprising a pivoted operating arm movable between two positions for starting and stopping refrigeration at predetermined maximum and minimum temperatures, a temperature-responsive element for effecting movement of said arm, a biasing spring engaging said arm for opposing said element, a rotatable structure including a cam and a ratchet, a pawl mounted on said arm and engaging said ratchet for rotating said structure upon movement of said arm to its refrigeration-starting position, locking means effective after predetermined rotation of said rotatable structure for engaging said cam to block further movement of said rotatable structure, the engagement of said pawl with said ratchet preventing movement of said arm to its refrigeration-starting position when further movement of said ratchet is prevented by engagement of said locking means with said cam whereby a defrost period is initiated, a second pivoted arm extending generally parallel to said operating arm, and a second spring disposed between said arms for biasing said second arm away from said operating arm, and means for limiting movement of said second arm away from said operating arm, said second arm being actuated by said temperature-responsive element against the bias of said second spring upon the occurrence of a predetermined abnormally high temperature of said temperature-responsive element for moving said locking means out of blocking engagement with said cam to again afford movement of said ratchet whereby said defrost period is terminated.

7. A refrigerator control comprising an operating arm movable between two positions for starting and stopping refrigeration at predetermined maximum and minimum temperatures, a temperature-responsive element for effecting movement of said arm, a biasing spring engaging said arm for opposing said element, a rotatable structure including a cam and a ratchet, a pawl mounted on said arm and engaging said ratchet for rotating said cam upon movement of said arm to its refrigeration-starting position, said cam having a recess in the periphery thereof, locking means receivable within said recess after predetermined rotation of said cam for blocking further movement of said rotatable structure, the engagement of said pawl with said ratchet preventing movement of said arm to its refrigeration-starting position when further movement of said rotatable structure is prevented by engagement of said locking means with said recess whereby a defrost period is initiated, and means dependent upon a predeterminated abnormally high temperature of said temperature-responsive element for shifting said locking means out of locking engagement with said recess to again afford movement of said ratchet whereby said defrost period is terminated, movement of said operating arm to its refrigeration-starting position at the end of the defrost period being effective through said pawl for advancing said cam to shift said recess beyond said locking means whereby reentry of said locking means into said recess is prevented.

8. A refrigerator control comprising a pivoted operating arm movable between two positions for starting and stopping refrigeration at predetermined maximum and minimum temperatures, a temperature-responsive element for effecting movement of said arm, a biasing spring engaging said arm for opposing said element, a rotatable structure including a cam and a ratchet, a pawl mounted on said arm and engaging said ratchet for rotating said structure upon movement of said arm to its refrigeration-starting position, said cam having a recess in the periphery thereof, a pivoted lever, said lever including a roller, means for biasing said lever to maintain said roller in engagement with the periphery of said cam, said roller being receivable within said recess after predetermined rotation of said cam for blocking further movement of said rotatable structure, the engagement of said pawl with said ratchet preventing movement of said arm to its refrigeration-starting position when further movement of said cam is prevented by engagement of said roller in said recess whereby a defrost period is initiated, a second pivoted arm extending generally parallel to said operating arm, a second spring disposed between said arms for biasing said second arm away from said operating arm, said second arm being actuated by said temperature-responsive element against the bias of said second spring upon the occurrence of a predetermined abnormally high temperature of said temperature-responsive element for moving said roller out of said recess to again afford movement of said ratchet whereby said defrost period is terminated, and a brake arm mounted on said operating arm and engaging said cam upon movement of said operating arm to its refrigeration-starting position for preventing overtravel of said cam.

9. A refrigerator control comprising an operating arm movable between two positions for starting and stopping refrigeration at predetermined maximum and minimum temperatures, a temperature-responsive element for effecting movement of said arm, a biasing spring engaging said arm for opposing said element, a rotatable structure including a cam and a ratchet, a first pawl mounted on said arm and engaging said ratchet for rotating said structure upon movement of said arm to its refrigeration-starting position, a second pawl engaging said ratchet for preventing reverse rotation of said rotatable structure, a pivoted lever, a second spring engaging said lever and said second pawl for biasing said lever into engagement with the periphery of said cam and for biasing said second pawl into engagement with said ratchet, said cam having a recess in the periphery thereof, a portion of said lever being receivable within said recess after a predetermined rotation of said rotatable structure for blocking further movement of said rotatable structure, the engagement of said first pawl with said ratchet preventing movement of said arm to its refrigeration-starting position when further movement of said ratchet is prevented by engagement of said pivoted lever with said cam whereby a defrost period is initiated, and means dependent upon a predetermined abnormally high temperature of said temperature-responsive element for shifting said pivoted lever out of blocking engagement with said cam to again afford movement of said ratchet whereby said defrost period is terminated.

CHARLES S. GRIMSHAW.

References Cited in the file of this patent

UNITED STATES PATENTS

| Number | Name | Date |
| --- | --- | --- |
| 1,867,711 | Raney | July 19, 1932 |
| 1,933,580 | Bauer | Nov. 7, 1933 |
| 1,979,103 | Gaynor | Oct. 30, 1934 |
| 2,459,083 | McCloy | Jan. 11, 1949 |